(12) United States Patent
Edge et al.

(10) Patent No.: US 10,878,587 B2
(45) Date of Patent: Dec. 29, 2020

(54) ALIGNMENT OF OBJECTS TO MULTI-LAYER GRID LAYOUTS

(71) Applicant: MICROSOFT TECHNOLOGY LICENSING, LLC, Redmond, WA (US)

(72) Inventors: Darren Edge, Beijing (CN); Sitao Xiang, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 260 days.

(21) Appl. No.: 16/062,098

(22) PCT Filed: Jan. 26, 2016

(86) PCT No.: PCT/CN2016/072181
§ 371 (c)(1),
(2) Date: Jun. 13, 2018

(87) PCT Pub. No.: WO2017/128043
PCT Pub. Date: Aug. 3, 2017

(65) Prior Publication Data
US 2018/0374225 A1 Dec. 27, 2018

(51) Int. Cl.
*G06K 9/32* (2006.01)
*G06T 7/33* (2017.01)
(Continued)

(52) U.S. Cl.
CPC .............. *G06T 7/33* (2017.01); *G06F 40/106* (2020.01); *G06K 9/6206* (2013.01); *G06T 7/12* (2017.01);
(Continued)

(58) Field of Classification Search
CPC ... G06T 7/33; G06T 7/12; G06T 11/60; G06T 2207/30176; G06F 40/106; G06K 9/6206
See application file for complete search history.

(56) References Cited

U.S. PATENT DOCUMENTS 4,301,470 A 11/1981 Pagany
5,712,995 A * 1/1998 Cohn ................... G06F 3/0481
715/792

(Continued)

FOREIGN PATENT DOCUMENTS

CN 1804863 A 7/2006
CN 101625414 A 1/2010

OTHER PUBLICATIONS

"Supplementary Search Report Issued in European Patent Application No. 16886930.3", dated May 29, 2019, 8 Pages.
(Continued)

*Primary Examiner* — Solomon G Bezuayehu
(74) *Attorney, Agent, or Firm* — Merchant & Gould, P.C.

(57) ABSTRACT

A solution for aligning objects to multi-layer grid layouts is proposed. For a document including multiple objects, a first alignment is performed on edges of a plurality of objects to be aligned. Irregularities in edge orderings are reduced. Then, a second alignment is performed on the edges of the plurality of objects based on the first alignment. A first grid layout of the plurality of objects is generated. A third alignment is then performed based on the first grid layout of the plurality of objects and a second grid layout of the plurality of objects is generated.

20 Claims, 8 Drawing Sheets

(51) Int. Cl.
  *G06T 11/60* (2006.01)
  *G06F 40/106* (2020.01)
  *G06T 7/12* (2017.01)
  *G06K 9/62* (2006.01)

(52) U.S. Cl.
  CPC .... *G06T 11/60* (2013.01); *G06T 2207/30176* (2013.01)

(56) References Cited

U.S. PATENT DOCUMENTS

| | | | |
|---|---|---|---|
| 7,068,288 | B1 | 6/2006 | Good et al. |
| 7,177,045 | B2 * | 2/2007 | Goel ............... G06K 15/02 358/1.18 |
| 7,788,579 | B2 | 8/2010 | Berkner et al. |
| 8,091,021 | B2 | 1/2012 | Bargeron et al. |
| 8,249,356 | B1 * | 8/2012 | Smith ............... G06K 9/00463 382/199 |
| 8,775,918 | B2 | 7/2014 | Livshin et al. |
| 9,164,777 | B2 | 10/2015 | Prasad et al. |
| 9,201,855 | B2 | 12/2015 | Yalovsky |
| 2002/0095439 | A1 | 7/2002 | Long et al. |
| 2004/0225986 | A1 * | 11/2004 | Lin ............... G06F 30/39 716/122 |
| 2005/0223319 | A1 * | 10/2005 | Ohashi ............... G06T 11/206 715/248 |
| 2007/0021860 | A1 | 1/2007 | Gertrudus Simons et al. |
| 2007/0162844 | A1 | 7/2007 | Woodall et al. |
| 2008/0197280 | A1 * | 8/2008 | Tanaka ............... G01N 23/225 250/306 |
| 2008/0256439 | A1 | 10/2008 | Boreham et al. |
| 2011/0239107 | A1 * | 9/2011 | Phillips ............... G11B 27/034 715/234 |
| 2012/0162266 | A1 | 6/2012 | Douglas et al. |
| 2014/0129910 | A1 | 5/2014 | Kota et al. |
| 2014/0258849 | A1 | 9/2014 | Chung et al. |
| 2014/0368547 | A1 | 12/2014 | Elings |

OTHER PUBLICATIONS

Brown, Heather, "Standards for Structured Documents", In the Computer Journal, vol. 32, No. 6, Dec. 1, 1989, pp. 505-514.

"How to Configure Grid and Ruler in PowerPoint", Retrieved from: https://www.free-power-point-templates.com/articles/how-to-configure-grid-and-ruler-in-powerpoint/, Feb. 28, 2012, 2 Pages.

"Align Objects", Retrieved from: https://support.office.com/en-us/article/Align-objects-e3a5aeed-d551-4fc4-804b-570b170686f2, Jan. 6, 2016, 3 Pages.

"Use Master-Level Guides to Align Objects Across all Slides", Retrieved from: https://support.office.com/en-us/article/Use-master-level-guides-to-align-objects-across-all-slides-80e0171a-a5f6-499b-8a1e-c46da02b3287, 1 Page.

International Search Report and Written Opinion for PCT/CN2016/072181 dated Oct. 31, 2016.

"Office Action Issued in European Patent Application No. 16886930.3", dated Jan. 30, 2020, 5 Pages.

* cited by examiner

ALIGNMENT OF OBJECTS TO MULTI-LAYER GRID LAYOUTS

CROSS-REFERENCE TO RELATED APPLICATION

This application is a U.S. National Stage Application of PCT/CN2016/072181, filed Jan. 26, 2016, which application is hereby incorporated by reference in its entirety for all that it teaches and for all purposes. To the extent appropriate, a claim of priority is made to the above disclosed application.

BACKGROUND

In environments like document editing applications, a document often contains multiple objects such as shapes, paragraphs or the like. Conventionally, users may intend to create layouts with regularity in object alignment, sizing, and spacing. There are several existing tools such as gridlines, layout guides or layout commands to assist in creation of such regular layouts associated with the multiple objects in the document. The gridline systems may usually use equal intervals between all lines in both horizontal and vertical dimensions, which may limit objects and spacing to be multiple of a same grid size. The layout guides can temporarily appear when a dragged object comes into a state of alignment or equivalent spacing with existing objects.

SUMMARY

In accordance with implementations of the subject matter described herein, a solution for aligning objects to multi-layer grid layouts is proposed. For a document including multiple objects (for example, shapes, lines, paragraphs, and the like), implementations of the subject matter described herein perform a first alignment on edges of a plurality of objects to be aligned. Irregularities in edge orderings are reduced. Then, a second alignment may be performed on the edges of the plurality of objects based on the first alignment. A first grid layout of the plurality of objects may be generated. A third alignment is then performed based on the first grid layout of the plurality of objects and a second grid layout of the plurality of objects may be generated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols are used to indicate the same or similar elements.

DETAILED DESCRIPTION

The subject matter described herein will now be discussed with reference to several example implementations. It should be understood these implementations are discussed only for enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," "third" and the like may refer to different or same objects. Other definitions, explicit and implicit, can be included below.

Traditionally creating a regular layout for a number of document objects is complicated and time-consuming. Although some applications may provide tools to address the problem, some problems or limitations may exist. For example, when using conventional tools such as gridlines, layout guides or layout commands to create layouts associated with multiple objects in a document, there are usually many similar object positions or object spacings to snap against, which may be both visually distracting and physically demanding. Moreover, the layout commands may require the desired layouts to be planned in advance. As a result, it may be complicated and time-consuming to multi-select the objects in turn and apply to them the layout commands to create the final regular layouts. These and other potential problems can be solved by implementations of the subject matter described herein.

Figures 1, 2:
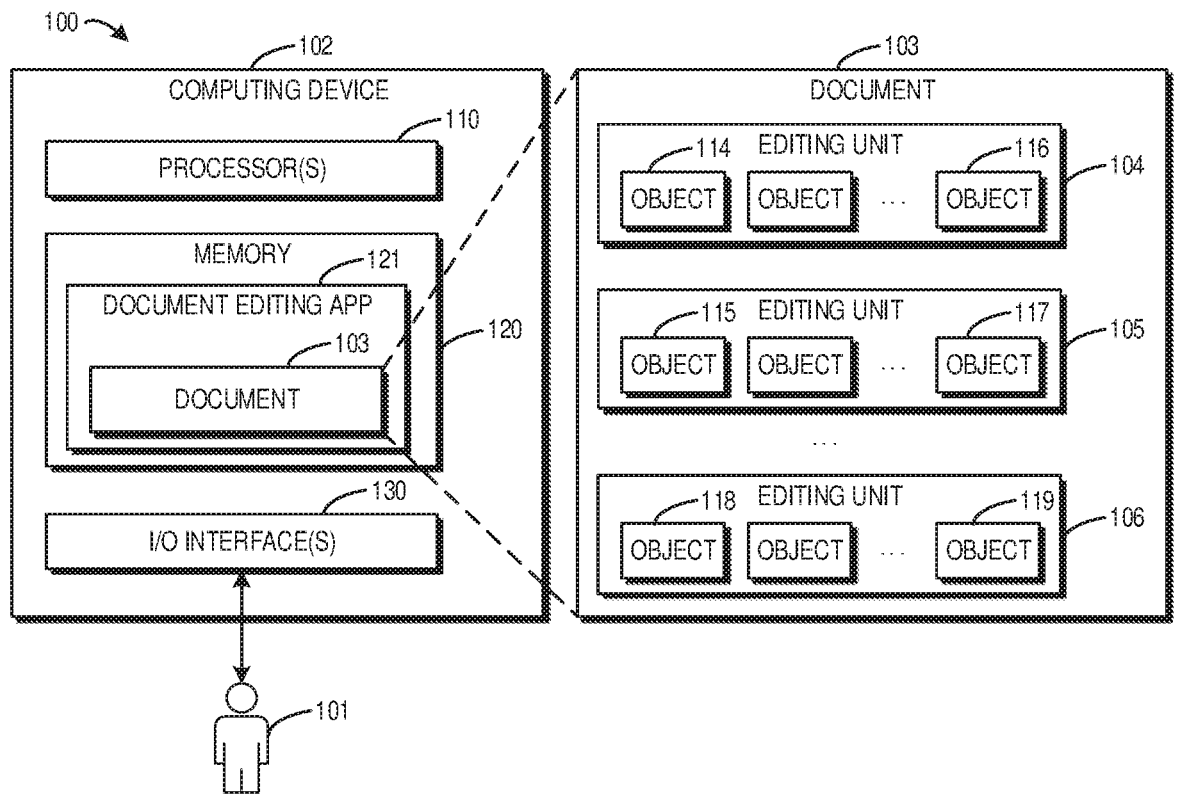
FIG. 1 is a block diagram of an environment 100 where implementations of the subject matter described herein can be implemented.
FIG. 2 is a flowchart of a method 200 for aligning objects to multi-layer grid layouts in accordance with implementations of the subject matter described herein.

FIG. 1 illustrates a block diagram of an environment 100 where implementations of the subject matter described herein can be implemented. As shown, the environment 100 includes a user 101 and a computing device 102.

The computing device 102 may be a desktop computer, a laptop computer, a tablet, a smart phone, or any other types of computing device. The components of the computing device 102 may include, but are not limited to, one or more processors 110, a memory 120, and one or more I/O interfaces 130. The memory 120 may store various modules, applications, programs, or other data. Further, the memory 120 may include instructions that, when executed by the processor(s) 110, cause the processor(s) 110 to perform operations described herein for the computing device 102. In the computing device 102, the I/O interface(s) 130 may support one or more of various different input devices and output devices that enable the user 101 to interact with the computing device 102. For example, the input device(s) may include a user device such as keyboard, keypad, touch pad, trackball, and the like. The output device(s) may include a display, for example.

The computing device 102 may have additional features and/or functionality. For example, the computing device 102 may also include additional data storage devices (removable and/or non-removable), such as magnetic disks or optical disks. Such additional storage may include removable storage and/or non-removable storage. Computer-readable media may include at least two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the computing device 102. Any such computer storage media may be part of the computing device 102. Moreover, the computer-readable media may include computer-executable instructions that, when executed by the processor(s), perform various functions and/or operations described herein. In contrast, communication media may embody computer-readable instructions, data structures, program modules, or other data in a modulated data signal, such as a carrier wave, or other mechanism. As defined herein, computer storage media does not include communication media.

The memory 120 may store a document editing application 121 for processing a document 103. The documents 103 may be a presentation document or a text document. The document 103 may include one or more editing units. As used herein, the term "editing units" refers to basic units composing the document 103. Examples of the editing units include, but are not limited to, slides in a presentation document or pages in a text document, such as editing units 104, 105 and 106 as shown in FIG. 1. Each of the editing units may include one or more objects (for example, shapes, lines, paragraphs or the like). For example, the editing unit 104 is shown to include objects 114 and 116, the editing unit 104 is shown to include objects 115 and 117 and the editing unit 106 is shown to include objects 118 and 119. In the following discussions, only for the purpose of illustration, some implementations will be described where the document 103 is a presentation document and the editing units 104, 105 and 106 are slides within the presentation document.

FIG. 2 illustrates a flowchart of a method 200 for aligning objects to multi-layer grid layouts in accordance with implementations of the subject matter described herein. The method 200 can be implemented by the computing device 102 as shown in FIG. 1, for example. More specifically, the method 200 can be implemented as part of the document editing application 121.

The method 200 is entered in step 210, where a first alignment is performed on edges of a plurality of objects to be aligned. In some implementations, the plurality of objects to be aligned may include all objects within an editing unit of the document 103 (for example, all objects within the editing unit 105 as shown in FIG. 1). Alternatively, or in addition, the plurality of objects to be aligned may be multi-selected by the user 101 (for example, the objects 114 and 116 within the editing unit 104). Moreover, each of the plurality of objects may have a different shape, such as rectangle, triangle and so on. In the following discussions, only for the purpose of illustration, some implementations will be described where each of the plurality of objects to be aligned is a rectangle without rotation, which have top edge, bottom edge, left edge and right edge.

Figure 3:
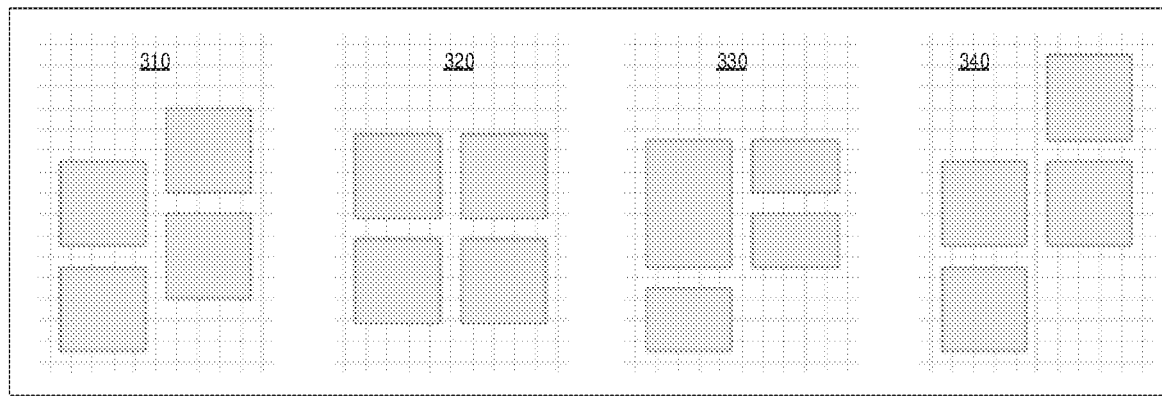
FIG. 3 illustrates an example of determining a "good" edge order in accordance with implementations of the subject matter described herein.

By performing the first alignment, irregularities in edge orderings may be reduced, thereby obtaining a "good" edge order. For example, FIG. 3 illustrates an example of determining a "good" edge order in accordance with implementations of the subject matter described herein. As shown, there are four different layouts of objects in this example, including initial input 310 and possible resulting outputs 320-340. In the following discussions, only one dimension (for example, horizontal edges) will be discussed. It is to be understood, however, that this is merely for the purpose of simplification, without suggesting any limitations as to the scope of the subject matter described herein. In some implementations, top edges and bottom edges can be denoted by T and B respectively, and all horizontal edges in the four layouts as shown in FIG. 3 can be listed from top to bottom as follows:

310: TTBTBTBB
320: TTBBTTBB
330: TTBTBBTB
340: BTTBBTBT

As shown by the listed horizontal edges of the four layouts, the output 320 has only four consecutive sequences of edges facing a same direction, which are "TT", "BB", "TT" and "BB", while the outputs 330 and 340 have two more consecutive sequences of edges facing a same direction, respectively. Accordingly, the output 320 may be determined to be better than the outputs 330 and 340 since the output 320 gives the minimum number of consecutive sequences of edges facing a same direction. The other dimension (for example, vertical edges) may be considered in a similar fashion, and thus will not be discussed herein.

Figure 4:
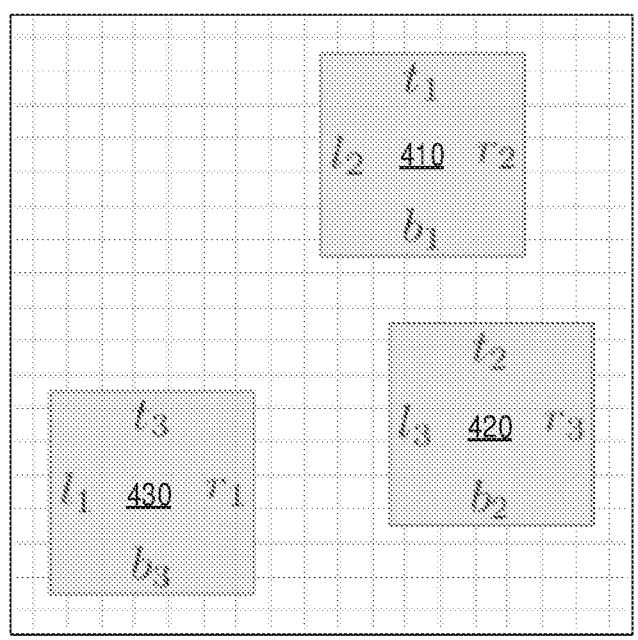
FIG. 4 is a schematic diagram of a layout of objects in connection with which the edge constraints will be described in accordance with implementations of the subject matter described herein.

In some implementations, some edge constraints may be defined to avoid a destructive layout of the plurality of objects. The destructive layout of the plurality of objects may include an object being collapsed, a new overlap being created and/or an existing overlap being destroyed, for example. FIG. 4 illustrates an example layout of objects in connection with which the edge constraints will be described. As shown, three objects 410-430 are included. The edges facing different directions are identified by different letters: l for left, r for right, t for top, and b for bottom. They are numbered from left to right or top to bottom. For example, a notation "$\prec$" may be used to indicate the order. Examples of the edge constraints can be given as follows.

For each object, its left edge must be kept to the left of its right edge, and its top edge must be kept to the top of its bottom edge: $l_1 \prec r_1$ and $t_1 \prec b_1$, and the like. If two objects are separated along one axis but overlap along the other, they must remain separated along the separating axis and keep their original order: $r_1 \prec l_3$ and $b_1 \prec t_2$. If two objects are separated along both axes, they should be at least kept separated along one axis and the axis along which their original distance is larger may be chosen: $b_1 \prec t_3$, instead of $r_1 \prec l_2$.

Figure 5:
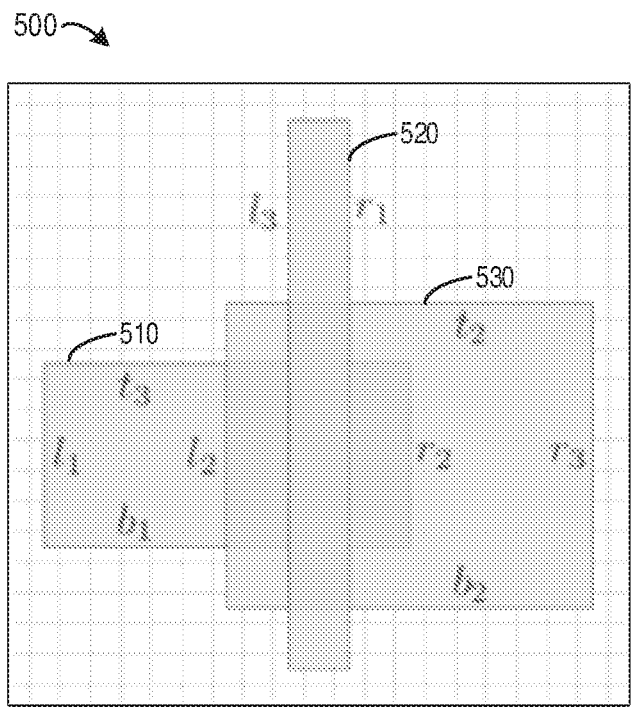
FIG. 5 is a schematic diagram of another layout of objects in connection with which the edge constraints will be described in accordance with implementations of the subject matter described herein.

Moreover, some edge constraints need to be defined for overlapping objects. Some example edge constraints will be described with reference to FIG. 5 which illustrates another layout of objects. As shown in FIG. 5, three overlapping objects 510-530 are included. The edges facing different directions are identified by different letters: l for left, r for right, t for top, and b for bottom. They are numbered from left to right or top to bottom and the notation "$\prec$" may be used to indicate the order. Examples of the edge constraints for overlapping objects can be given as follows.

When the input contains two overlapping objects, the edges facing each direction may be required to keep their original order and may not be aligned. For example, in FIG. 5, $l_1 \prec l_2$, $r_2 \prec r_3$, $t_2 \prec t_3$ and $b_1 \prec b_2$ may be required, but $l_2 \prec r_2$ may not be required. Note that, for example, overlapping shapes may not be separated by requiring $r_2 \prec l_2$, since the overlapping may be intended.

Figure 6:
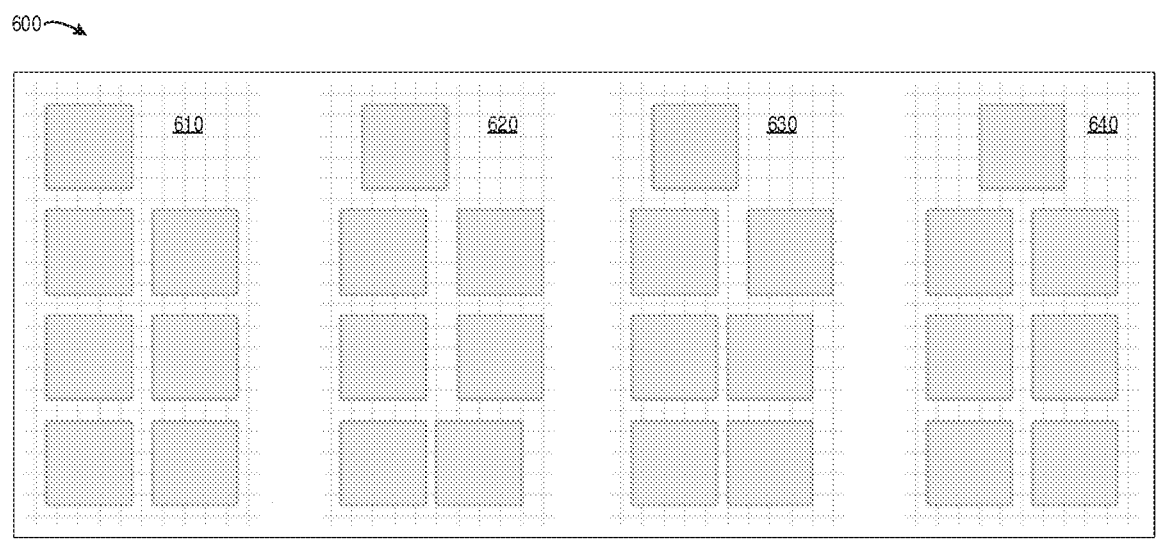
FIG. 6 illustrates another example of determining a "good" edge order in accordance with implementations of the subject matter described herein.

Under the edge constraints as described above, a candidate order giving the minimum number of consecutive sequences of the edges facing a same direction may be determined. However, there are usually multiple candidate orders that give the minimum number of consecutive sequences of the edges facing a same direction. In such cases, only one order can be selected from them. For example, FIG. 6 illustrates an example of determining a "good" edge order in accordance with implementations of the subject matter described herein. Four object layouts 610-640 are shown in FIG. 6. Only for the purpose of simplification, only vertical edges may be considered and left edges and right edges may be denoted by L and R respectively. All vertical edges in the four layouts as shown in FIG. 6 can be listed from left to right as follows:

610: LLLLRRRRLLLRRR
620: LLLLRRRLRLLRRR
630: LLLLRRRLLRLRRR
640: LLLLRRRLLLRRRR

As shown by the listed vertical edges of the four layouts, the layouts 610 and 640 have four consecutive sequences of edges facing a same direction respectively, while the layouts 620 and 630 have two more consecutive sequences of edges facing a same direction respectively. Moreover, there is only one inversion between the layouts 610 and 620 and between the layouts 630 and 640, while there are two inversions between the layouts 610 and 630 and between the layouts 620 and 640. In such cases, a "good" edge order may be determined such that a number of consecutive sequences of edges facing a same direction and a number of inversions relative to an original order of the edges are minimized. As shown in FIG. 6, for example, if the input (that is, the original layout of objects) is 620, the layout 610 may represent the "good" edge order; if the input is 630, the layout 640 may represent the "good" edge order.

Figure 7:
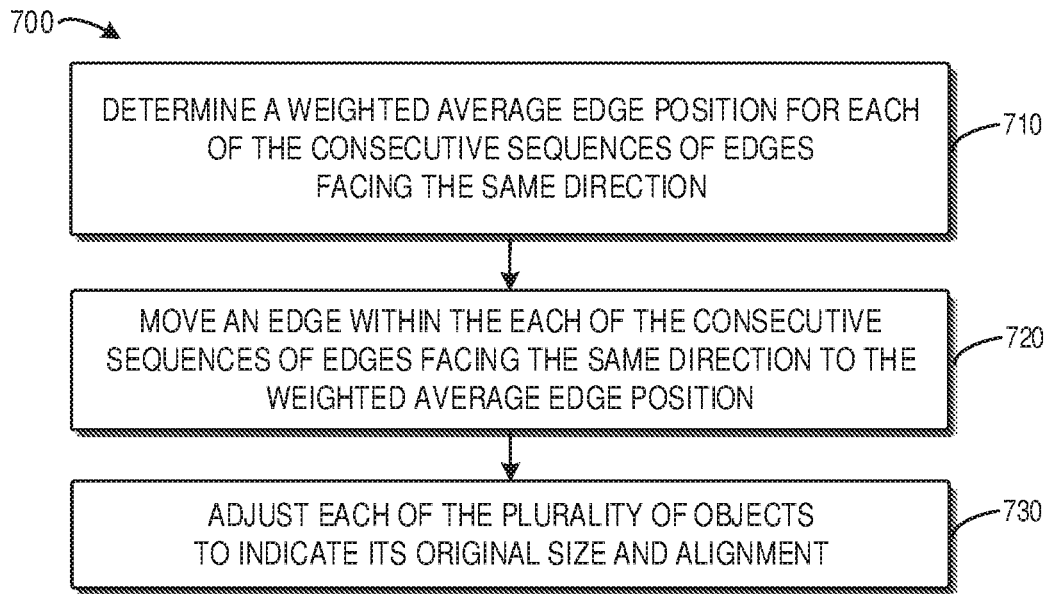
FIG. 7 is a flowchart of a method 700 for performing a first alignment to reduce irregularities in edge orderings in accordance with implementations of the subject matter described herein.

That is, it is desired to change the original order of edges such that the number of consecutive sequences of the edges facing a same direction and the number of inversions relative to the original order of the edges are minimized. FIG. 7 illustrates a flowchart of a method 700 for performing the first alignment to reduce irregularities in edge orderings in accordance with implementations of the subject matter described herein. The method 700 can be implemented by the computing device 102 as shown in FIG. 1, and more specifically, by the document editing application 121, for example.

In step 710, a weighted average edge position for each of the consecutive sequences of edges facing the same direction is determined. In some implementations, a weight may be assigned to an edge. A higher weight may be assigned to an edge which if moved will have a higher visual significance. This weight may be affected by not only the edge itself but also one or more other edges of the same object. For example, increasing the width of a rectangle that is thin and tall will have more visual significance than increasing its height. As such, a weighted average edge position (for example, the weighted average x coordinate for vertical edges and the weighted average y coordinate for horizontal edges) for each of the consecutive sequences of edges facing the same direction can be determined.

Figure 8:
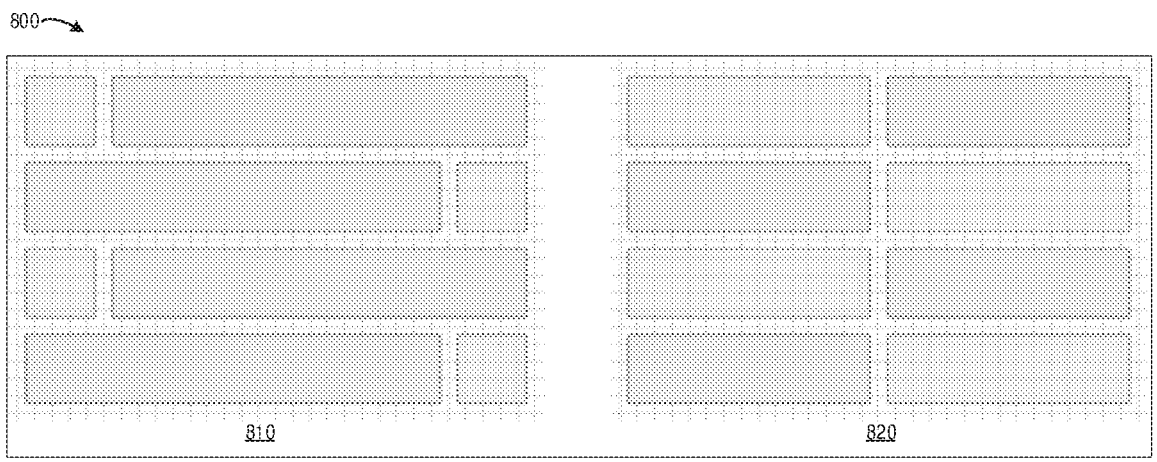
FIG. 8 is a schematic diagram of the destructive effect of aligning objects in accordance with implementations of the subject matter described herein.

Then the method 700 proceeds to step 720, where an edge within the each of the consecutive sequences of edges facing the same direction is moved to the weighted average edge position. The result of step 720 may be destructive. For example, FIG. 8 illustrates a schematic diagram of the destructive effect. As shown, there is an input object layout 810 and a resulting layout 820 which is obtained by moving edges in step 720. It can be seen that the regularities in the input 810 is not well preserved in the output 820. Therefore, an adjustment is needed to avoid such a destructive effect.

The method 700 proceeds to step 730 to perform such adjustment. Specifically, in step 730, each of the plurality of objects is adjusted to indicate its original size and alignment. In some implementations, this can be done by allowing objects to shrink. In other implementations, this step can be omitted in case it will cause a new overlap. Alternatively, or in addition, the distance that an object will be moved in step 730 may be proportional to the distance that it has been moved in step 720. Step 730 may have an effect that a column of objects with similar width but are spread horizontally will be nearly center-aligned while a column of object with varying width but are nearly aligned to one side will keep that configuration.

Still in reference with FIG. 2, the method 200 proceeds to step 220, where a second alignment is performed on the edges of the plurality of objects based on the first alignment to generate a first grid layout of the plurality of objects. In general, this can be done by partitioning the edges of the plurality of objects into groups, and then performing a detailed alignment within each of the groups. To avoid making the above problem intractable, partitioning the edges into too many groups and moving some objects too far from their original position should be prevented as much as possible. As such, the above problem can be described by a cost function defined as follows. Only for the purpose of simplification, one dimension (for example, vertical edges) may be considered in the following discussions and the principle can be applied to the other dimension likewise.

The edges of the plurality of objects may be denoted by $x_1, x_2 \ldots x_n$ (that is, the x coordinate for vertical edges), and a set of edges $\{x_i, x_{i+1}, \ldots, x_j\}$ may be denoted by $x_{i\ldots j}$. For any set of edges S, the minimum cost F(S) of partitioning S into subsets and aligning each subset may be expressed as follows:

$$F(x_{1\ldots i}) = \min_{0 \leq j < i} (F(x_{1\ldots j}) + f(x_{(j+1)\ldots i}))(i \geq 1)$$

$$F(x_{1\ldots 0}) = 0$$

where $f(S)$ represents the cost of aligning all edges in the set S. In order to punish creating too many groups and moving edges too far, the cost of creating a new group can be made constant and the cost of moving an edge can be made proportional to the square of the distance moved. As described above, a weight can be assigned to an edge. A higher weight may be assigned to an edge which if moved will have a higher visual significance. For an edge $x_i$, its weight $t_i$ can be decided based on the width and height of the associated object, for example, as follows:

$$t_i = \left(\frac{h_i}{\bar{h}}\right)^{1.5} \left(\frac{w_i}{\bar{w}}\right)^{-0.5},$$

where $\bar{w}$ and $\bar{h}$ represent the average width and height of all objects, respectively. Then $f(S)$ can be expressed as follows:

$$f(x_{i\ldots j}) = c + \sum_{k=i}^{j} t_k \left(\frac{x_k - p(x_{i\ldots j})}{\bar{w}}\right)^2$$

where c represents the cost of creating a group, and p(S) represents the aligned position if the set of edges S are to be aligned together. By taking $$\frac{\partial f}{\partial x_k},$$

the p(S) that minimizes $f(S)$ can be determined as the weighted average position:

$$p(x_{i\ldots j}) = \frac{\sum_{k=i}^{j} t_k x_k}{\sum_{k=i}^{j} t_k}$$

In some situations, the "average size" which can be defined as the average width and height of all objects may fail to capture the actual granularity of the layout, especially when there are objects that span multiple rows or columns. Therefore, in some implementations, the cost function as described above may be optimized.

In some implementations, the constant c can be eliminated to avoid require additional input from the user. For example, the constant c can be fixed to a suitable value such as 1 and a suitable normalizing factor can be found to capture the actual granularity of the layout. As described above, an order giving the minimum number of consecutive sequences of edges facing a same direction may be determined in the method 700 as described with reference to FIG. 7. For example, a consecutive sequence of edges facing left or right may be called a "half column", where the consecutive sequence of edges facing left can be called a "left half column" and where the consecutive sequence of edges facing right can be called a "right half column". Likewise, a consecutive sequence of edges facing top or bottom may be called a "half row", where the consecutive sequence of edges facing top can be called a "top half row" and where the consecutive sequence of edges facing right can be called a "bottom half row". In the sequence of half columns obtained from the method 700, a left half column followed by a right half column can be called a "column" and an object can be called "in this column" if its left edge is in that left half column and its right edge is in that right half column. For each column, one with the smallest width from all the objects in this column may be taken if it exists. Then the normalizing factor, which is referred to as the characteristic width, can be taken to be the average width $\hat{w}$ of these selected objects. In some implementations, if an object is not in any single column, center alignment might be desirable. That is, in addition to the actual edges, a "central edge" for this object can be added to the set of edges. Finally, the cost function may be changed. The visual effect of moving some edges together may be affected much more by the range of these edges than the number of edges. Additionally, since the algorithm may rely on aligning opposite edges across a gap and then shrinking the objects to create equalized spacing, closing gaps should be encouraged.

For a set of edges S, the cost function $f(S)$ can be expressed as follows:

$$f(S) = 1 + \lambda_1 \frac{\text{range}(L(S)) + \text{range}(C(S)) + \text{range}(R(S))}{\hat{w}} + \frac{h(p(S) - p(R(S))) + h(p(L(S) - p(S)))}{\hat{w}}$$

$$h(x) = \begin{cases} \lambda_2 x, & x \geq 0 \\ -\lambda_3 x, & x < 0 \end{cases}$$

where p(S) represents the weighted average position of edges as described above, L(S), C(S) and R(S) represents the set of all left, central and right edges in S, respectively, range( ) represents the maximum minus the minimum, and $\lambda_1$, $\lambda_2$ and $\lambda_3$ represents positive values with a same order of magnitude by experiments, where $\lambda_2 < \lambda_3$. In order to construct the above cost function, left, right and central edges within each edge group may be first separated into three subgroups. Each subgroup may be aligned to its weighted average position, and the cost may be proportional to the range of the edges. Then each subgroup may be moved towards the weighted average position of the whole group. Moving the central subgroup may have no visual effect and thus cause no cost. Moving the left subgroup leftwards and moving the right subgroup rightwards may be considered to be "closing the gap," which causes a relatively low cost. On the other hand, moving towards the opposite directions may be considered to be "widening the gap" which causes a relatively high cost.

Figure 9:
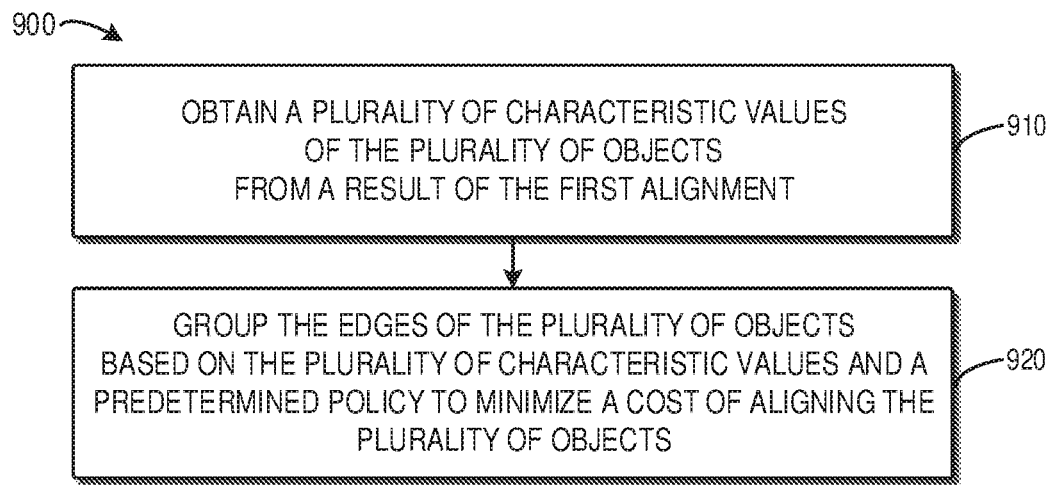
FIG. 9 is a flowchart of a method 900 for performing a second alignment to generate a first grid layout of the plurality of objects in accordance with implementations of the subject matter described herein.

FIG. 9 illustrates a flowchart of a method 900 for performing the second alignment to generate a first grid layout of the plurality of objects in accordance with implementations of the subject matter described herein. The method 900 can be implemented by the computing device 102 as shown in FIG. 1. For example, the method 900 can be implemented as part of the document editing application 121.

In step 910, a plurality of characteristic values of the plurality of objects is obtained from a result of the first alignment. For example, the characteristic width of a column and the characteristic height of a row can be obtained from a result of the method 700 as described with reference to FIG. 7. Then the method 900 proceeds to step 920, where the edges of the plurality of objects are grouped based on the plurality of characteristic values and a predetermined policy, to minimize a cost of aligning the plurality of objects. In some implementations, as described above, for an object spanning multiple rows or columns, a center/middle edge can be added to the set of edges to support center/middle alignment. The cost function can be constructed based on the plurality of characteristic values. More specifically, the construction may include punishing both the creation of groups and the range of edges within each subgroup for each edge type in each of the groups. In addition, the construction may include encouraging the closing of gaps between edges of opposing types (such as the gap between a right edge and a left edge, or the gap between a bottom edge and a top edge).

Still in reference with FIG. 2, the method 200 proceeds to step 230, where a third alignment is performed based on the first grid layout of the plurality of objects, to generate a second grid layout of the plurality of objects. The purpose of step 230 is to decide an aligned position for each group based on the grouping result from step 220 and further to decide spacing for each of the horizontal and vertical directions.

Figure 10:
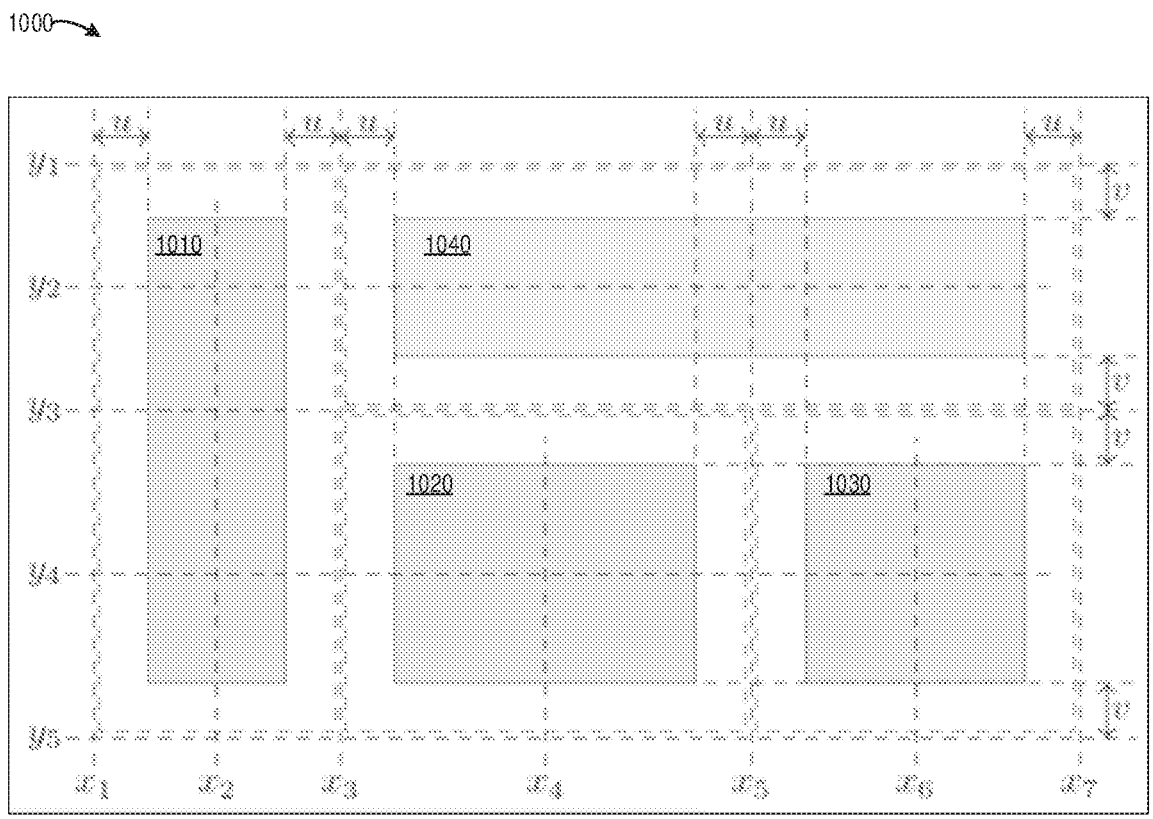
FIG. 10 illustrates an example of assigning variables to various quantities in accordance with implementations of the subject matter described herein.

In some implementations, the two axes may be no longer decoupled but optimized together. A variable may be assigned for each align group to represent its position and two further variables may be assigned to represent the spacing of the two axes. The size of the objects and any other lengths of interest may be represented by linear combinations of these variables. FIG. 10 illustrates an example of assigning variables to various quantities in accordance with implementations of the subject matter described herein. As shown, the align group of the left edge of rectangle 1020 is assigned a variable $x_3$, the align group of the right edge is assigned a variable $x_5$, and half of the horizontal spacing is assigned a variable u, then the resulting width of the rectangle 1020 is $x_5-x_3-2u$.

In one implementation, as the most straightforward way to find optimal positions and spacing, it is possible to optimize a sum of some least square terms, each responsible for some objective. For example, if the original width of rectangle 1020 is $w_B$ and if it is not desirable to cause the resulting width to differ from the original too much, $(x_5-x_3-2u-w_B)^2$ can be added to the objective function. However, in some situations, there may be conflicting objectives. It is supposed that the original height of rectangles 1020 and 1030 are $h_B$ and $h_C$, respectively, the resulting height obtained by minimizing the sum of squared difference could be some weighted average of $h_B$ and $h_C$. If $h_B$ and $h_C$ are very different, it is often more desirable to have the resulting height equal to one of them.

In general, it is often more desirable to exactly satisfy a subset of constraints and ignore the other than to make compromises between all objectives. Therefore, in some implementations, instead of $$f(x) = \frac{1}{2}x^2,$$

a loss function with the form of $$f(x) = \frac{1}{2}x^2 - \frac{\lambda}{2}e^{-(\frac{x}{t})^2}$$

can be used. That is, a Gaussian term is subtracted from the conventional square term. This function is single-peaked and has a special property. In this case, ratios between certain quantities may be considered, that is, $$f(\ln x_1 - \ln x_2) = f\left(\ln\frac{x_1}{x_2}\right).$$

The rectangles 1040 as shown in FIG. 10 will be described as an example.

First, the difference between the resulting width/height and the original width/height of each object should be considered, as discussed above. That is, $$f\left(\ln\frac{x_7 - x_3 - 2u}{w_D}\right) \text{ and } f\left(\ln\frac{y_3 - y_1 - 2v}{h_D}\right)$$

can be added to the objective function. Second, the different between the central edges to the real centers should be considered. Since all edges from the same object are separated, the movement of these edges may cause the central edges to no longer be at the center of the objects. Therefore, $$f\left(\ln\frac{x_7 - x_5 - u}{x_5 - x_3 - u}\right) \text{ and } f\left(\ln\frac{y_3 - y_2 - v}{y_2 - y_1 - v}\right)$$

can be added to the objective function. Third, the difference between the resulting aspect ratio and the original aspect ratio should be considered. That is, $$f\left(\ln\frac{h_D(x_7 - x_3 - 2u)}{w_D(y_3 - y_1 - 2v)}\right)$$

can be added to the objective function. The objective function may be optimized with the gradient descent method. Note that all terms are with the form of $$f\left(\ln\frac{ax + b}{cx + d}\right),$$

and me partial derivative with respect to each variable can be found to be as follows:

$$\frac{\partial}{\partial x_i} f\left(\ln\frac{ax + b}{cx + d}\right) = \left(\frac{a_i}{ax + b} - \frac{c_i}{cx + d}\right) f'\left(\ln\frac{ax + b}{cx + d}\right)$$

$$f'(x) = x + \frac{\lambda x}{t^2}e^{-(\frac{x}{t})^2}$$

In addition, the orders between the position variables may still need to be maintained to ensure that the spacing is positive. Therefore, $g(x_{i+1}-x_i)$, $g(y_{i+1}-y_i)$, $g(u)$ and $g(v)$ can be added and given higher weights, where:

$$g(x) = \begin{cases} 0, & x \geq 0 \\ x^2, & x < 0 \end{cases}$$

The initial value of the position variables of each align group is the aligned position as described above with respect to step 220. For the initial value of the spacing variables, when computing the cost of each align group, the average position for the left subgroup and right subgroup were calculated. The distance between these two positions may be taken to be the gap width of this align group, and the initial value for spacing variables may be taken to be the average of the gap width of all align groups.

It is to be understood that different objectives might cause different effects of alignment. For example, choosing the set of objectives as described above may cause the plurality of objects to be aligned and resized to generate the second grid layout with a more consistent visual effect. In other implementations, a different set of objectives can be selected to cause the plurality of objects to be only aligned but not resized. As such, multiple strategies for aligning, spacing and resizing objects (for example, aligning and spacing but not resizing versus aligning, spacing and resizing) can be implemented and the associated results can be provided to the user for selection. Each strategy can also evaluate its own confidence that it has improved the layout in the manner desired, and these confidence values can be used to determine whether to make the change or show a suggestion associated with the change.

In some implementations, as shown in FIG. 1, the document editing application 121 may provide different commands (such as different buttons) to the user 101. Each command may correspond to one strategy for strategies for aligning, spacing and/or resizing objects. In response to receiving a command from the user 101 (for example, in response to one button being pressed by the user 101), the corresponding strategy may be applied to the plurality of objects to be aligned. In other implementations, a strategy can be provided as a suggestion that may requires selection by the user 101 before the plurality of objects are updated accordingly. For example, a specific user interface may be provided to present the suggestion. Alternatively, or in addition, the suggestion may be presented as a preview of the document 103 with the suggestion being applied to the plurality of objects. In such cases, in response to the suggestion being selected by the user 101, the corresponding strategy may be applied to the plurality of objects to be aligned.

Figure 11:
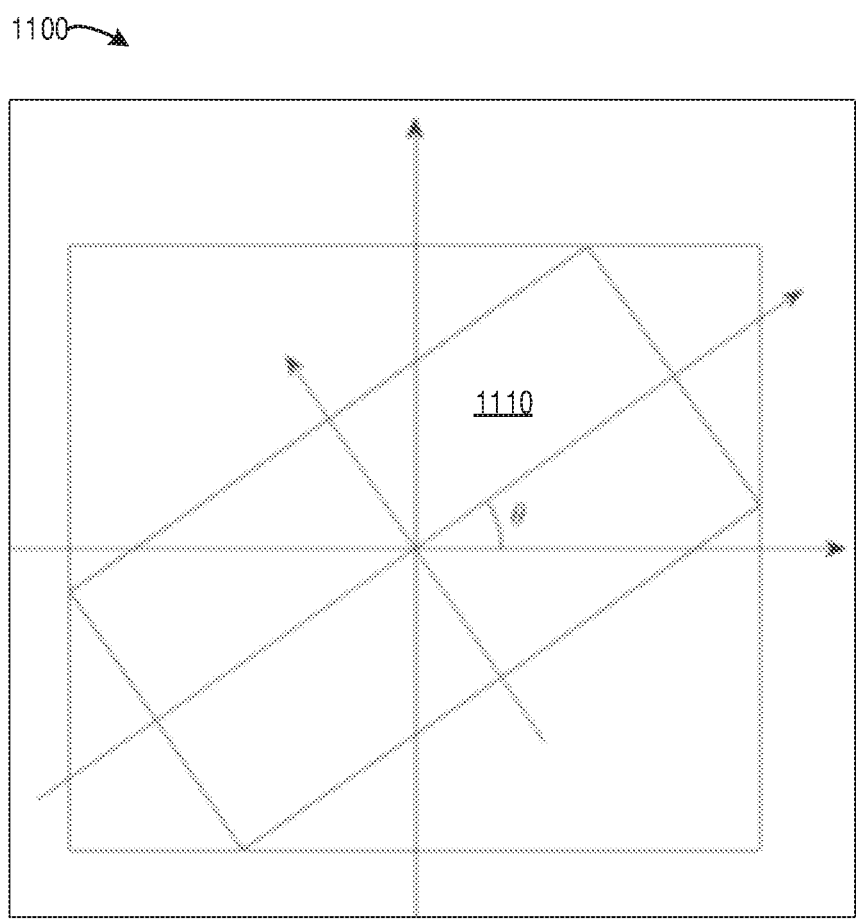
FIG. 11 illustrates an example of a rotated object in accordance with implementations of the subject matter described herein.

In the above discussions, some implementations have been described with respect to objects without rotation for the purpose of simplification. However, in some implementations of the invention, a solution for rotated objects can be provided. A bounding box of a rotated object may be used to simplify the problem. In some situations, if the rotation angle of the rotated object requires to be kept after the alignment, for a given bounding box with an arbitrary aspect ratio, the desired resulting object may not exist. Even if there may be a solution satisfying such requirement, the shape of the resulting object could often differ considerably from the shape of the original object. In such cases, the change in rotation angle and aspect ratio of the rotated object need to be balanced. For example, FIG. 11 illustrates an example of a rotated object 1110 in accordance with implementations of the subject matter described herein. Assume that the original rotation angle of the object 1110 is $\theta$ and the original aspect ratio is r. If the resulting rotation angle is $\theta'$, then the resulting aspect ratio r' can be calculated as follows.

$$r' = \frac{1 - r \cdot \tan\theta'}{r - \tan\theta'}$$

$\theta'$ which minimizes $$(\theta' - \theta)^2 + \lambda \ln\left(\frac{r'}{r}\right)^2,$$

where $\lambda$ is a balancing weight can be found. For example, the optimal $\theta'$ can be found by simply enumerating all values in the valid range of $\theta'$ with a fixed interval.

Figure 12:
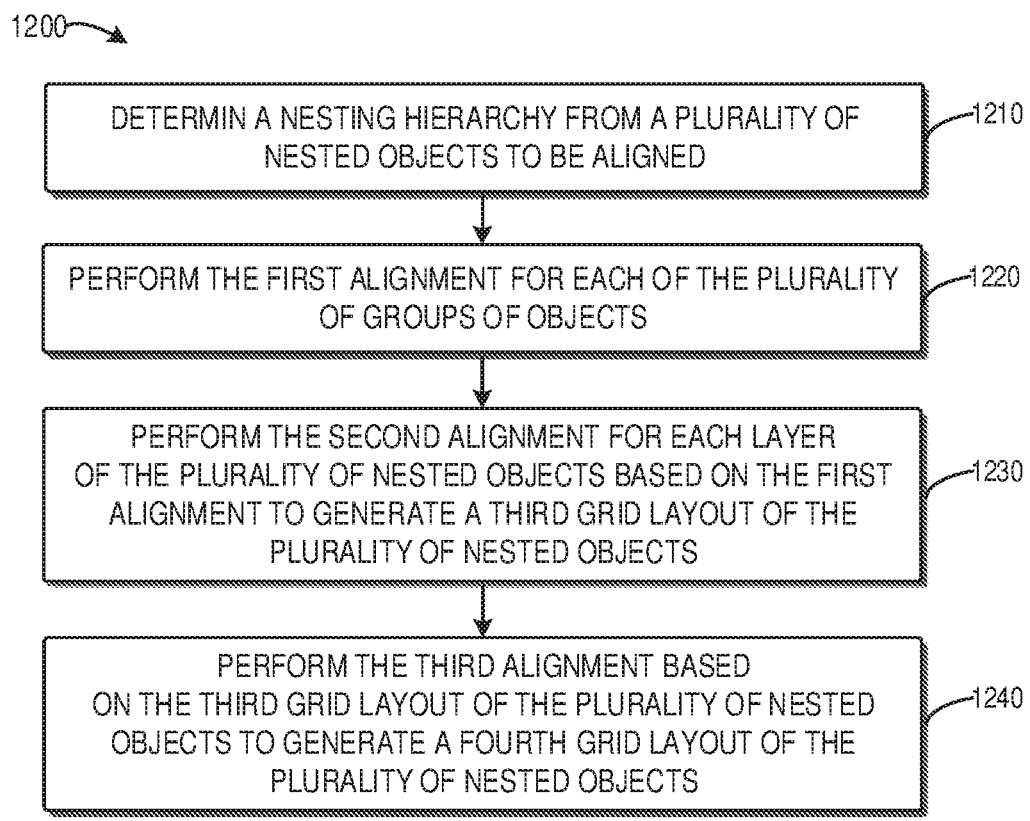
FIG. 12 is a flowchart of a method 1200 for aligning nested objects to multi-layer grid layouts in accordance with implementations of the subject matter described herein.

In some situations, the plurality of objects to be aligned may include some overlapping or nested objects. A solution for such cases may be provided in some implementations of the invention. For example, FIG. 12 illustrates a method 1200 for aligning nested objects to multi-layer grid layouts in accordance with implementations of the subject matter described herein. The method 1200 can be implemented by the computing device 102 as shown in FIG. 1, for example. Alternatively, or in addition, the method 1200 can be implemented as part of the document editing application 121.

In step 1210, a nesting hierarchy is determined from a plurality of nested objects to be aligned. The nesting hierarchy may include a plurality of groups of objects, each of the plurality of groups of objects including a top-layer object and a plurality of child objects each of which is nested by an object within the group of objects, and each of the plurality of objects having a layer number to indicate a layer of the object. For example, the plurality of nested objects to be aligned may comprise a first object and a second object. In one implementation, it can be determined that the first object contains the second object if all the following conditions are satisfied: (1) the first object is lower than the second object in z-order; (2) the width and height of the first object is larger than the width and height of the second object respectively; (3) the width and height of the intersection of the first and second objects is larger than a certain fraction (for example, 0.8) of the width and height of the second object; and (4) if the second object is fixed, the first object will have the highest z-order among all objects that satisfy all the above. An object may contain multiple children, but the condition (4) may ensure that the parent of any object is unique. As such, the layer number of the first object can be determined to be a certain number if the first object is nested by objects at each of the certain number of lower layers.

Then the method 1200 proceeds to step 1220, where for each of the plurality of groups of objects, the first alignment is performed on edges of objects within the group of objects. Step 1220 of the method 1200 may correspond to step 210 of the method 200 as described with reference to FIG. 2, and thus will not be described in detail herein.

Then the method 1200 proceeds to step 1230, where for each layer of the plurality of nested objects, the second alignment is performed based on the first alignment, to generate a third grid layout of the plurality of nested objects. As such, from the bottom layer to the top layer, the characteristic sizes for each layer can be determined separately. Step 1230 of the method 1200 may correspond to step 220 of the method 200 as described with reference to FIG. 2, and thus will not be described in detail herein.

Figure 13:
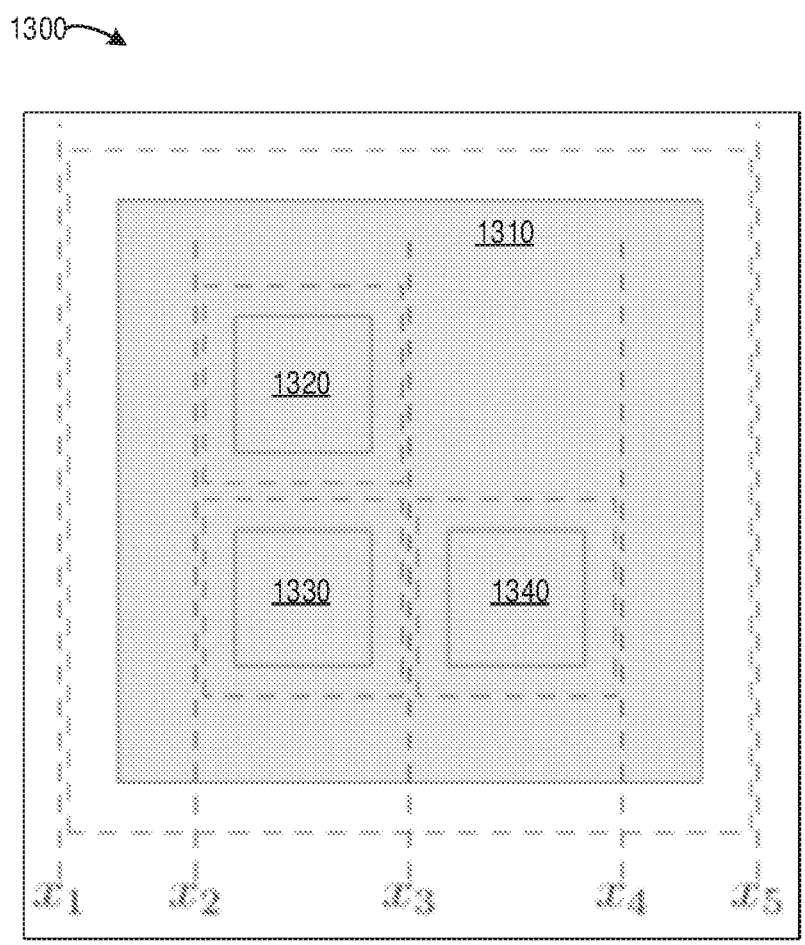
FIG. 13 illustrates an example of equalizing margins in accordance with implementations of the subject matter described herein.

Then the method 1200 proceeds to step 1240, where the third alignment is performed based on the third grid layout of the plurality of nested objects, to generate a fourth grid layout of the plurality of nested objects. Step 1240 may still consider all objects at once, but different pairs of spacing variables may be assigned to different layers. In addition, for each object that have any children, a term may be added to equalize the margin. FIG. 13 illustrates an example of equalizing margins in accordance with implementations of the subject matter described herein. In the configuration as shown in FIG. 13, a term $$f\left(\ln\frac{(x_2+u_2)-(x_1+u_1)}{(x_5-u_1)-(x_4-u_2)}\right)$$

may be added to the objective function, where $u_1$ and $u_2$ represent horizontal spacing variables of the first and second layers respectively. Since step 1240 of the method 1200 may correspond to step 230 of the method 200 as described with reference to FIG. 2, and thus will not be described in detail herein.

Through the above descriptions, it would be appreciated that implementations of the subject matter as described herein allow taking a rough arrangement of objects and transforms those objects into a more consistent state of alignment with more regular object sizes and spacing between objects. The capability can be applied to objects that whose selection is implicit or explicit, and can be similarly invoked from a trigger that is implicit or explicit. The transformed layout can be applied directly, updating objects in place, or can be shown as a suggestion that requires selection by the user before the objects are updated accordingly. Multiple strategies for aligning, spacing, and resizing objects can be implemented as multiple commands or multiple suggestions. Each strategy can also evaluate its own confidence that it has improved the layout in the manner desired, and these confidence values can be used to determine whether to make the change or show the suggestion. The implementations of the subject matter as described herein enable dealing appropriately with objects that are nested, overlapping, or rotated, and forcing objects into the best-fitting grid layout even if the initial arrangement of the objects is so distorted that the underlying grid structure cannot easily be perceived.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some example implementations of the subject matter described herein are listed below.

In an aspect, a device is provided. The device comprises a processing unit and a memory, the memory being coupled to the processing unit and storing instructions for execution by the processing unit, the instructions, when executed by the processing unit, causing the device to perform a first alignment on edges of a plurality of objects to be aligned to reduce irregularities in edge orderings; perform a second alignment on the edges of the plurality of objects based on the first alignment, to generate a first grid layout of the plurality of objects; and perform a third alignment based on the first grid layout of the plurality of objects, to generate a second grid layout of the plurality of objects.

In some implementations, the instructions, when executed by the processing unit, further cause the device to apply the second grid layout to the plurality of objects in response to receiving a command from a user.

In some implementations, the instructions, when executed by the processing unit, further cause the device to present the second grid layout as a suggestion to a user for selection; and apply the second grid layout to the plurality of objects in response to the suggestion being selected by the user.

In some implementations, the instructions, when executed by the processing unit, further cause the device to define a constraint for the edges of the plurality of objects to avoid a destructive layout of the plurality of objects, the destructive layout of the plurality of objects including at least one of the following: an object being collapsed, a new overlap being created and an existing overlap being destroyed.

In some implementations, the instructions, when executed by the processing unit, further cause the device to determine, under the constraint, an order of the edges for both horizontal and vertical dimensions, such that a number of consecutive sequences of edges facing a same direction and a number of inversions relative to an original order of the edges are minimized.

In some implementations, the instructions, when executed by the processing unit, further causes the device to determine a weighted average edge position for each of the consecutive sequences of edges facing the same direction; move an edge within the each of the consecutive sequences of edges facing the same direction to the weighted average edge position; and adjust each of the plurality of objects to indicate its original size and alignment.

In some implementations, the instructions, when executed by the processing unit, further cause the device to obtain from a result of the first alignment a plurality of characteristic values of the plurality of objects; and group the edges of the plurality of objects to minimize a cost of aligning the plurality of objects based on the plurality of characteristic values and a predetermined policy.

In some implementations, the instructions, when executed by the processing unit, further cause the device to determine final positions and spacing for the plurality of objects to generate the second grid layout with a more consistent visual effect.

In some implementations, the instructions, when executed by the processing unit, further causes the device to determine, from a plurality of nested objects to be aligned, a nesting hierarchy including a plurality of groups of objects, each of the plurality of groups of objects including a top-layer object and a plurality of child objects, each of the child objects being nested by an object within the group, and each of the plurality of objects having a layer number to indicate a layer of the object; perform, for each of the plurality of groups of objects, the first alignment on edges of objects within the group of objects; perform, based on the first alignment, the second alignment for each layer of the plurality of nested objects to generate a third grid layout of the plurality of nested objects; and perform, based on the third grid layout of the plurality of nested objects, the third alignment to generate a fourth grid layout of the plurality of nested objects.

In some implementations, the plurality of nested objects to be aligned comprises a first object and a second object, and the instructions, when executed by the processing unit, further cause the device to determine the second object is nested by the first object if the first object is the topmost object underlying the most area of the second object; and determine the layer number of the first object to be a certain number if the first object is nested by objects at each of the certain number of lower layers.

In another aspect, a method is provided. The method comprises performing, on edges of a plurality of objects to be aligned, a first alignment to reduce irregularities in edge orderings; performing, based on the first alignment, a second alignment on the edges of the plurality of objects to generate a first grid layout of the plurality of objects; and performing, based on the first grid layout of the plurality of objects, a third alignment to generate a second grid layout of the plurality of objects.

In some implementations, the method further comprises in response to receiving a command from a user, applying the second grid layout to the plurality of objects.

In some implementations, the method further comprises presenting the second grid layout as a suggestion to a user for selection; and in response to the suggestion being selected by the user, applying the second grid layout to the plurality of objects.

In some implementations, the method further comprises defining a constraint for the edges of the plurality of objects to avoid a destructive layout of the plurality of objects, the destructive layout of the plurality of objects including at least one of the following: an object being collapsed, a new overlap being created and an existing overlap being destroyed.

In some implementations, performing the first alignment on the edges of the plurality of objects to be aligned comprises determining, under the constraint, an order of the edges for both horizontal and vertical dimensions, such that a number of consecutive sequences of edges facing a same direction and a number of inversions relative to an original order of the edges are minimized.

In some implementations, performing the first alignment on the edges of the plurality of objects to be aligned comprises determining a weighted average edge position for each of the consecutive sequences of edges facing the same direction; moving an edge within the each of the consecutive sequences of edges facing the same direction to the weighted average edge position; and adjusting each of the plurality of objects to indicate its original size and alignment.

In some implementations, performing the second alignment on the edges of the plurality of objects comprises obtaining, from a result of the first alignment, a plurality of characteristic values of the plurality of objects; and grouping, based on the plurality of characteristic values and a predetermined policy, the edges of the plurality of objects to minimize a cost of aligning the plurality of objects.

In some implementations, performing the third alignment comprises determining final positions and spacing for the plurality of objects to generate the second grid layout with a more consistent visual effect.

In some implementations, the method further comprises determining, from a plurality of nested objects to be aligned, a nesting hierarchy including a plurality of groups of objects, each of the plurality of groups of objects including a top-layer object and a plurality of child objects, each of the child objects being nested by an object within the group, and each of the plurality of objects having a layer number to indicate a layer of the object; performing, for each of the plurality of groups of objects, the first alignment on edges of objects within the group of objects; performing, based on the first alignment, the second alignment for each layer of the plurality of nested objects to generate a third grid layout of the plurality of nested objects; and performing, based on the third grid layout of the plurality of nested objects, the third alignment to generate a fourth grid layout of the plurality of nested objects.

In some implementations, the plurality of nested objects to be aligned comprises a first object and a second object, and determining the nesting hierarchy comprises determining the second object is nested by the first object if the first object is the topmost object underlying the most area of the second object; and determining the layer number of the first object to be a certain number if the first object is nested by objects at each of the certain number of lower layers.

In yet another aspect, a computer program product is provided. The computer program product is tangibly stored on a non-transient machine-readable medium and comprises machine-executable instructions, the instructions, when executed on a device, causing the device to perform steps of the method.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
a processing unit;
a memory coupled to the processing unit and storing instructions for execution by the processing unit, the instructions, when executed by the processing unit, causing the device to:
perform, on edges of a plurality of objects to be aligned, a first alignment to reduce irregularities in edge orderings;
obtain, from a result of the first alignment, a plurality of characteristic values of the plurality of objects;
group, based on the plurality of characteristic values and a predetermined policy, the edges of the plurality of objects, into a plurality of groups, to minimize a cost of aligning the plurality of objects;
perform, based on the first alignment, a second alignment on the edges of the plurality of objects, in each of the plurality of groups, to generate a first grid layout of the plurality of objects; and
perform, based on the first grid layout of the plurality of objects, a third alignment to generate a second grid layout of the plurality of objects.

2. The device of claim 1, wherein the instructions, when executed by the processing unit, further cause the device to:
in response to receiving a command from a user, apply the second grid layout to the plurality of objects.

3. The device of claim 1, wherein the instructions, when executed by the processing unit, further cause the device to:
present the second grid layout as a suggestion to a user for selection; and
in response to the suggestion being selected by the user, apply the second grid layout to the plurality of objects.

4. The device of claim 1, wherein the instructions, when executed by the processing unit, further cause the device to:
define a constraint for the edges of the plurality of objects to avoid a destructive layout of the plurality of objects, the destructive layout of the plurality of objects including at least one of the following: an object being collapsed, a new overlap being created and an existing overlap being destroyed.

5. The device of claim 4, wherein the instructions, when executed by the processing unit, further cause the device to:
determine, under the constraint, an order of the edges for both horizontal and vertical dimensions, such that a number of consecutive sequences of edges facing a same direction and a number of inversions relative to an original order of the edges are minimized.

6. The device of claim 5, wherein the instructions, when executed by the processing unit, further cause the device to:
determine a weighted average edge position for each of the consecutive sequences of edges facing the same direction;
move an edge within the each of the consecutive sequences of edges facing the same direction to the weighted average edge position; and
adjust each of the plurality of objects to indicate its original size and alignment.

7. The device of claim 1, wherein the cost of moving an edge is proportional to a square of a distance moved.

8. The device of claim 1, wherein the instructions, when executed by the processing unit, further cause the device to:
determine final positions and spacing for the plurality of objects to generate the second grid layout with a more consistent visual effect.

9. The device of claim 1, wherein the instructions, when executed by the processing unit, further cause the device to:
determine, from a plurality of nested objects to be aligned, a nesting hierarchy including the plurality of groups of objects, each of the plurality of groups of objects including a top-layer object and a plurality of child objects, each of the child objects being nested by an object within the group, and each of the plurality of objects having a layer number to indicate a layer of the object;
perform, for each of the plurality of groups of objects, the first alignment on edges of objects within the group of objects;
perform, based on the first alignment, the second alignment for each layer of the plurality of nested objects to generate a third grid layout of the plurality of nested objects; and
perform, based on the third grid layout of the plurality of nested objects, the third alignment to generate a fourth grid layout of the plurality of nested objects.

10. The device of claim 9, wherein the plurality of nested objects to be aligned comprises a first object and a second object, and wherein the instructions, when executed by the processing unit, further cause the device to:
determine the second object is nested by the first object if the first object is the topmost object underlying the most area of the second object; and
determine the layer number of the first object to be a certain number if the first object is nested by objects at each of the certain number of lower layers.

11. A computer-implemented method comprising:
performing, on edges of a plurality of objects to be aligned, a first alignment to reduce irregularities in edge orderings;
obtaining, from a result of the first alignment, a plurality of characteristic values of the plurality of objects;
grouping, based on the plurality of characteristic values and a predetermined policy, the edges of the plurality of objects, into a plurality of groups, to minimize a cost of aligning the plurality of objects;
performing, based on the first alignment, a second alignment on the edges of the plurality of objects, in each of the plurality of groups, to generate a first grid layout of the plurality of objects; and
performing, based on the first grid layout of the plurality of objects, a third alignment to generate a second grid layout of the plurality of objects.

12. The method of claim 11, further comprising:
in response to receiving a command from a user, applying the second grid layout to the plurality of objects.

13. The method of claim 11, further comprising:
presenting the second grid layout as a suggestion to a user for selection; and
in response to the suggestion being selected by the user, applying the second grid layout to the plurality of objects.

14. The method of claim 11, further comprising:
defining a constraint for the edges of the plurality of objects to avoid a destructive layout of the plurality of objects, the destructive layout of the plurality of objects including at least one of the following: an object being collapsed, a new overlap being created and an existing overlap being destroyed.

15. The method of claim 14, wherein performing the first alignment on the edges of the plurality of objects to be aligned comprises:
   determining, under the constraint, an order of the edges for both horizontal and vertical dimensions, such that a number of consecutive sequences of edges facing a same direction and a number of inversions relative to an original order of the edges are minimized.

16. The method of claim 15, wherein performing the first alignment on the edges of the plurality of objects to be aligned comprises:
   determining a weighted average edge position for each of the consecutive sequences of edges facing the same direction;
   moving an edge within the each of the consecutive sequences of edges facing the same direction to the weighted average edge position; and
   adjusting each of the plurality of objects to indicate its original size and alignment.

17. The method of claim 11, wherein a cost of creating a new group is constant.

18. The method of claim 11, wherein performing the third alignment comprises:
   determining final positions and spacing for the plurality of objects to generate the second grid layout with a more consistent visual effect.

19. The method of claim 11, further comprising:
   determining, from a plurality of nested objects to be aligned, a nesting hierarchy including the plurality of groups of objects, each of the plurality of groups of objects including a top-layer object and a plurality of child objects, each of the child objects being nested by an object within the group, and each of the plurality of objects having a layer number to indicate a layer of the object;
   performing, for each of the plurality of groups of objects, the first alignment on edges of objects within the group of objects;
   performing, based on the first alignment, the second alignment for each layer of the plurality of nested objects to generate a third grid layout of the plurality of nested objects; and
   performing, based on the third grid layout of the plurality of nested objects, the third alignment to generate a fourth grid layout of the plurality of nested objects.

20. A computer program product being tangibly stored on a non-transient machine-readable medium and comprising machine-executable instructions, the instructions, when executed on a device, causing the device to perform acts including:
   performing, on edges of a plurality of objects to be aligned, a first alignment to reduce irregularities in edge orderings;
   obtaining, from a result of the first alignment, a plurality of characteristic values of the plurality of objects;
   grouping, based on the plurality of characteristic values and a predetermined policy, the edges of the plurality of objects, into a plurality of groups, to minimize a cost of aligning the plurality of objects;
   performing, based on the first alignment, a second alignment on the edges of the plurality of objects, in each of the plurality of groups, to generate a first grid layout of the plurality of objects; and
   performing, based on the first grid layout of the plurality of objects, a third alignment to generate a second grid layout of the plurality of objects.

* * * * *